(12) United States Patent  
Al Kadi et al.

(10) Patent No.: US 11,841,416 B2  
(45) Date of Patent: Dec. 12, 2023

(54) RADAR SYSTEM FOR A VEHICLE

(71) Applicant: HELLA GmbH & Co. KGaA, Lippstadt (DE)

(72) Inventors: Muhammed Soubhi Al Kadi, Paderborn (DE); Tobias Breddermann, Lippstadt (DE); Ridha Farhoud, Laatzen (DE); Tai Fei, Hamm (DE); Christopher Grimm, Lippstadt (DE); Ernst Warsitz, Paderborn (DE)

(73) Assignee: HELLA GmbH & Co. KGaA

( * ) Notice: Subject to any disclaimer, the term of this patent is extended or adjusted under 35 U.S.C. 154(b) by 149 days.

(21) Appl. No.: 17/222,600

(22) Filed: Apr. 5, 2021

(65) Prior Publication Data

US 2021/0223379 A1 Jul. 22, 2021

Related U.S. Application Data

(63) Continuation of application No. PCT/EP2019/075717, filed on Sep. 24, 2019.

(30) Foreign Application Priority Data

Oct. 4, 2018 (DE) ..................... 10 2018 124 503.3

(51) Int. Cl.
*G01S 13/42* (2006.01)
*G01S 7/03* (2006.01)
(Continued)

(52) U.S. Cl.
CPC .............. *G01S 13/426* (2013.01); *G01S 7/03* (2013.01); *G01S 13/931* (2013.01); *H01Q 3/36* (2013.01); *G01S 2013/9314* (2013.01)

(58) Field of Classification Search
CPC ........ G01S 13/426; G01S 7/03; G01S 13/931; G01S 2013/9314; H01Q 3/36; H01Q 21/00; H01Q 21/06; H01Q 21/08
See application file for complete search history.

(56) References Cited

U.S. PATENT DOCUMENTS 9,310,478 B2 * 4/2016 Gross .................. H01Q 1/3233
9,778,350 B2 * 10/2017 Schoor ................ H01Q 3/2605
(Continued)

FOREIGN PATENT DOCUMENTS

CN 103907242 A 7/2014
DE 102012003877 A1 4/2013
(Continued)

OTHER PUBLICATIONS

International Search Report dated Jan. 14, 2020 in corresponding application PCT/EP2019/075717.
(Continued)

*Primary Examiner* — Peter M Bythrow
(74) *Attorney, Agent, or Firm* — Muncy, Geissler, Olds & Lowe, P.C.

(57) ABSTRACT

A radar system for a vehicle, having at least two transmission antennas, each for emitting a transmission signal into the surroundings of the vehicle, at least four reception antennas, each for acquiring a detection signal for detecting targets in the surrounding of the vehicle, and a processing device for determining the viewing angle, in order to assign phase information in the detection signals to at least one viewing angle for respective detected targets, such that a minimum ambiguous range of the reception antennas in a first direction is specific for the assignment to be ambiguous to more than one viewing angle, wherein all of the reception antennas are spaced apart from each other in the first direction by different distances such that only one of the distances corresponds to the minimum ambiguous range.

19 Claims, 4 Drawing Sheets

(51) Int. Cl.
*G01S 13/931* (2020.01)
*H01Q 3/36* (2006.01)

(56) References Cited

U.S. PATENT DOCUMENTS

| | | | | |
|---|---|---|---|---|
| 10,634,775 B2* | 4/2020 | Loesch | ............... | G01S 13/003 |
| 10,823,836 B2* | 11/2020 | Wintermantel | ....... | G01S 13/584 |
| 10,942,268 B2* | 3/2021 | Iida | .............. | H01Q 21/0025 |
| 2002/0145570 A1* | 10/2002 | Barnes | ............... | H01Q 1/525 |
| | | | | 343/824 |
| 2008/0150790 A1* | 6/2008 | Voigtlaender | ........ | G01S 13/87 |
| | | | | 342/127 |
| 2009/0046000 A1* | 2/2009 | Matsuoka | ............. | H01Q 3/26 |
| | | | | 342/147 |
| 2009/0224960 A1* | 9/2009 | Ishii | ............... | G01S 13/345 |
| | | | | 342/104 |
| 2011/0074620 A1* | 3/2011 | Wintermantel | ....... | G01S 7/0233 |
| | | | | 342/70 |
| 2011/0074621 A1* | 3/2011 | Wintermantel | ....... | H01Q 1/3233 |
| | | | | 342/70 |
| 2015/0247924 A1 | 9/2015 | Kishigami et al. | | |
| 2015/0253420 A1* | 9/2015 | Alland | ............... | G01S 7/03 |
| | | | | 342/156 |
| 2015/0260836 A1* | 9/2015 | Hayakawa | ........... | H01Q 13/206 |
| | | | | 342/368 |
| 2016/0033632 A1* | 2/2016 | Searcy | ............... | G01S 13/424 |
| | | | | 342/153 |
| 2016/0131742 A1* | 5/2016 | Schoor | ............... | H01Q 3/247 |
| | | | | 342/128 |
| 2016/0172767 A1* | 6/2016 | Ray | ............... | G01S 3/46 |
| | | | | 343/893 |
| 2017/0322295 A1* | 11/2017 | Loesch | ............... | G01S 13/931 |
| 2018/0088224 A1* | 3/2018 | Kishigami | ............. | H01Q 21/06 |
| 2018/0128913 A1* | 5/2018 | Bialer | ............... | G01S 13/89 |
| 2018/0149735 A1* | 5/2018 | Lim | ............... | G01S 13/931 |
| 2019/0207322 A1* | 7/2019 | Ding | ............... | G01S 7/03 |
| 2019/0250249 A1* | 8/2019 | Raphaeli | ............. | G01S 7/295 |
| 2019/0391230 A1* | 12/2019 | Loesch | ............... | G01S 13/42 |

FOREIGN PATENT DOCUMENTS

| | | |
|---|---|---|
| DE | 102013212079 A1 | 1/2015 |
| DE | 102014219113 A1 | 3/2016 |
| WO | WO2017179515 A1 | 10/2017 |
| WO | WO2017194503 A1 | 11/2017 |

OTHER PUBLICATIONS

Moffet, Alan T.: "Minimum-Redundancy Linear Arrays", IEEE Transactions on Antennas and Propagation, vol. AP-16, No. 2, Mar. 1968, pp. 172-175, ISSN: 0018-926X.

Jiang Haitao et al; "Application of Digital Beamforming in Vehicle Millimeter Wave Radar" Journal of Jiamusi University (Natural Science Edition) Vo. 36. No. 1 pp. 111-113, 130.

Translation of Chinese Office Action and Search Report dated Sep. 9, 2023 in corresponding application 201980062247.7.

* cited by examiner

RADAR SYSTEM FOR A VEHICLE

This nonprovisional application is a continuation of International Application No. PCT/EP2019/075717, which was filed on Sep. 24, 2019 and which claims priority to German Patent Application No. 10 2018 124 503.3, which was filed in Germany on Oct. 4, 2018 and which are both herein incorporated by reference.

BACKGROUND OF THE INVENTION

Field of the Invention

The present invention relates to a radar system for a vehicle.

Description of the Background Art

The range of applications for radar sensors in the automotive industry continues to increase. Both long-range functions such as a highway pilot with ranges of up to 200 m, for example, and short-range applications such as automated parking can be supported.

This places high demands on the measurement capability not only of the distance and the speed of targets, but also in relation to the angle of the targets. In far field applications, the focus is on azimuthal measurement capability. For example, it may be a requirement to enable unambiguous track assignment even in the 150 m to 200 m range. In addition, it should advantageously be possible to differentiate objects with the same distance and speed even at great distances, even if these objects are vehicles traveling in different lanes.

In near field applications, the requirements for azimuthal measurement capability may be lower, since angular errors do not have the same effect at short distances. However, significantly higher requirements are placed here on the measurement capability in elevation, in order to be able to classify objects with regard to their ability to be driven under and over.

In some cases, conventional solutions do not adequately meet these requirements. In particular, such solutions may be technically complicated and complex, and therefore also associated with higher costs.

SUMMARY OF THE INVENTION

It is therefore an object of the present invention to at least partially eliminate the disadvantages described above. In particular, it is the object to propose an improved antenna arrangement in order to meet the aforementioned requirements.

In an exemplary embodiment, the object is achieved in particular by a radar system for a vehicle, which comprises at least one of the following components: at least one or at least or exactly two transmission antennas, each for emitting a transmission signal into the surroundings of a vehicle, at least one or at least or exactly four reception antennas, each for acquiring a detection signal for detecting targets in the surroundings of a vehicle, in particular on the basis of the reflected transmission signal (reflections) at these targets, and/or a (in particular electronic) processing device for determining the viewing angle, preferably in order to assign phase information in the (acquired) detection signals to at least one viewing angle for respective detected targets, such that in particular a minimum ambiguous range of the reception antennas in a first direction is specific for the assignment to be ambiguous to more than one viewing angle.

In particular, it is provided that all of the reception antennas are arranged at different distances from one another in the first direction, so that preferably only one of these distances corresponds to the minimum ambiguous range. This offers the advantage that the assignment and thus the determination of the viewing angles for different targets can be improved. In particular, the antenna arrangement having the transmission and reception antennas allows for the ambiguity to be distributed over more viewing angles.

Advantageously, the minimum ambiguous range can be dependent on a wavelength specific to the radar system. This correlates in particular with a specification and preferably frequency of the radar system, and in particular with the transmission and/or detection signal. The wavelength can be determined, for example, on the basis of a phase evaluation of the detection signals of at least two reception antennas for different viewing angles (i.e., angles of incidence) of a target (i.e., of the reflected transmission signal originating therefrom), since the phase information (such as a phase difference of the detection signals) or the dependence of the phase information on the viewing angle correlates with the wavelength and, in particular, also with the distance between the reception antennas.

It can also be provided within the scope of the invention that all of the transmission and/or reception antennas are used when detecting targets in the far field and that only some of the transmission and/or reception antennas are used when detecting targets in the near field. A near field is present, for example, when the distance of the target from the radar system is less than 30 m, or less than 50 m, or less than 100 m. A far field exists in particular at a distance of more than 100 m or more than 120 m or more than 150 m.

The term viewing angle can refer to an angle of incidence at which a reflection of a target (i.e. in particular a transmission signal reflected by the target) strikes the reception antennas. Since the reception antennas are arranged at a distance from one another, different propagation times and thus phases can occur for different detection signals from different reception antennas as a function of this viewing angle. The phase information can be specific for these different propagation times and/or for the phase differences of the detection signals. Alternatively or additionally, the phase information can be specific or can be obtained by a beamforming technique as it is basically known from the prior art.

In particular, within the scope of the present invention, different distances of the antennas are considered identical if they differ only slightly from each other. This is the case, for example, with a difference in the distances in the range of at most 1/10 of the wavelength or at most 0.1 cm or at most 1/10 or at most 1/5 of the minimum ambiguous range.

The measurement capability in the angle, i.e. the determination of the viewing angle, can strongly depend on the antenna layout of the antenna array that is used, because the measurement of target angles is done by evaluating the difference in propagation times between the reception antennas. The difference in propagation times leads to a phase difference of the reception antennas.

The determination of the viewing angle is made possible, for example, by the following equation:

$$\Phi = \arcsin\left(\frac{\Delta s_{01}}{d_{01}}\right) = \arcsin\left(\frac{\Delta \varphi_{01}}{k d_{01}}\right)$$

Here, k denotes the wavenumber, d the distance and $\Delta\varphi$ the phase difference between two reception antennas.

With additional consideration of the reception amplitude, an optimum estimator according to the MSE criterion (minimum squared error) can also be realized by means of digital beamforming, for example. Therefore, the so-called digital beamforming can be used in a known manner as an angle estimation method for determining the viewing angle. In beamforming, for example, phase matching of the detection signals is performed in such a way that the received power is calculated for different phase matches (as possible viewing angles). In particular, the possible viewing angle corresponds to the searched viewing angle if there is a maximum of the received power.

In particular, the aperture (i.e., the largest distance between two antennas) can have a significant impact on the measurement performance of the antenna layout, since noise-like interferences are less significant with the antenna spacing d due to the scaling.

In addition, however, it is known that a distance of $d>\lambda/2$ leads to an ambiguous angle measurement, i.e. one and the same phase (and/or phase information) leads to at least two possible angles (viewing angles). Thus, an unambiguous angle measurement (i.e., viewing angle determination) is not possible. This becomes obvious on the basis of a beamforming spectrum (received power for different phase matchings or possible viewing angles entered over the different viewing angles). As an example, this is described on the basis of such a spectrum with four reception antennas at a distance of 1.5 times the wavelength $\lambda$ for a target at 0°. In this case, three peaks of the same height can occur at the viewing angles +/−40° and 0°, so that a clear determination of the viewing angle for this target is not possible.

A conventional solution to this problem is the use of uniform linear arrays (ULA), where the distance between two reception antennas is equal or smaller $\lambda/2$. However, this can compromise the aperture and thus the measurement capability.

Advantageously, the azimuthal distances of the reception antennas (Rx antennas) can be calculated according to the invention such that no distances between any two reception antennas are duplicated. This distributes the ambiguities over a maximum number of angles, increasing the robustness of the viewing angle estimate. In contrast to a ULA with four reception antennas, this antenna arrangement increases the aperture from, e.g., 1.5$\lambda$ to 3$\lambda$. The larger aperture can result in a narrower main lobe in the spectrum and thus a better angle estimate. The side lobes can be designed higher than with the ULA, but evenly distributed over the angular range.

Furthermore, a shift of one of the reception antennas in the elevation direction can be provided. Such a shift of one of the reception antennas in elevation can be neglected for long-range applications, if necessary, since all targets are approximately in the sensor plane due to the limited height of the targets. However, this shift may be essential for short-range applications as it allows for the elevation to be determined. Optionally, for short-range applications, the azimuth angle can therefore be calculated using only the other three reception antennas in an antenna layout according to the invention.

For calculating the azimuth, a first of the transmission antennas can be used in the short range as well as in the long range, if necessary. In elevation, the effective aperture can also be increased, if necessary, by means of the second transmission antenna shifted in elevation. This can preferably be done by the well-known MIMO concept. In other words, different combinations of antennas can be used for evaluating the targets and/or viewing angles in the azimuth direction than those in the elevation direction.

Advantageously, the two transmission antennas can be used to create a virtual antenna array with a total aperture of 2 times the wavelength.

Furthermore, it is advantageous if, within the scope of the invention, the transmission antennas are arranged in a first and/or second direction at a first distance and/or a second distance from one another, and at least one of the reception antennas is arranged in the second direction at the same second distance from the further of the reception antennas. In particular, the second distance corresponds to a twofold minimum ambiguous range. The transmission antennas may be arranged offset from each other in both the first and second directions at said second distance.

Advantageously, the first direction and the second direction are orthogonal to each other. In particular, the first direction is implemented as an azimuth direction and the second direction as an elevation direction of the radar system.

Also, it is optionally conceivable that the first direction is implemented as an azimuthal direction so that all of the distances of the reception antennas (i.e., in particular, between any two adjacent reception antennas) in the azimuthal direction differ from each other. In other words, the azimuthal distances of the reception antennas may be fixed in such a way that no azimuthal distances between any two reception antennas are duplicated. This distributes the ambiguities over a maximum number of angles, increasing the robustness of the viewing angle determination as an estimate of the viewing angles.

Preferably, it can be provided that (in particular exactly or exclusively) one of the different distances of the reception antennas in the first direction corresponds to the minimum ambiguous range and/or the further of the different distances of the reception antennas in the first direction correspond in each case to a multiple of the minimum ambiguous range, wherein preferably the minimum ambiguous range corresponds to half a wavelength, wherein the wavelength is specific for a wavelength of the transmission signal and/or detection signal, or of the radar system. The wavelength may be an indication of an electrical distance, since the actual spatial distance may possibly deviate therefrom due to a refractive index of a substrate of the radar system and/or further influences.

In a further option, it can be provided that the transmission antennas are arranged in the first direction and/or in the second direction at a distance from each other, which corresponds to a multiple of the minimum ambiguous range. This allows for the transmission antennas to be optimally matched to the reception antennas.

Furthermore, it is conceivable that exactly two transmission antennas and exactly four reception antennas are provided. This can provide a cost-effective antenna layout for the reliable detection of targets.

In another option, the arrangement of the transmission and reception antennas (i.e., the antenna layout) may be implemented according to a MIMO configuration. MIMO stands for Multiple Input Multiple Output, so that in this way the radar system can be provided as a MIMO radar system. This makes it possible to use an enlarged virtual aperture in the radar system.

According to a further option, it can be provided that the processing device is designed to use a different antenna combination of the transmission and reception antennas for the detection of the targets in the far field than that for the detection of the targets in the near field. For example, according to a first combination for the elevation in the near field, the first and second transmission antennas and the third and fourth reception antennas can be used. According to a second combination for the azimuth far field, for example, the first transmission antenna and the first through fourth reception antennas can be used. For a third combination for the azimuth near field, for example, the first transmission antenna and the first through third reception antennas can be used. This allows for optimal detection to be provided for different distances and/or directions of targets.

Advantageously, the invention can provide that a first and second and in particular a third of the reception antennas and preferably a first of the transmission antennas are arranged in a second direction at the same position, and a fourth of the reception antennas and/or a second of the transmission antennas are arranged offset from this position, and in particular the fourth of the reception antennas and second of the transmission antennas are arranged at the same position in the second direction. Thus, particularly advantageously, a MIMO radar technique can also be provided.

Advantageously, it can be provided within the scope of the invention that the processing device is designed to perform a beamforming technique for the determination of the viewing angle. This enables a particularly efficient and fast determination of the viewing angles.

The radar system is designed, for example, as a 24 GHz or 77 GHz radar system. Alternatively or additionally, the radar system is designed as a continuous-wave radar, in particular as an FMCW (frequency-modulated continuous-wave radar), which can perform a distance and/or speed measurement and/or viewing angle determination. A wavelength (e.g. for the transmission signal) can also be defined as a specification for the radar system, which correlates with the distances between the antennas.

Furthermore, the vehicle may be a motor vehicle and/or passenger vehicle and/or autonomous vehicle and/or electric vehicle and/or the like. The (possibly processed) detection information and/or the determined viewing angle is used, for example, by an assistance system and/or by a control unit of the vehicle, which provides at least partially autonomous driving and/or automatic parking of the vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
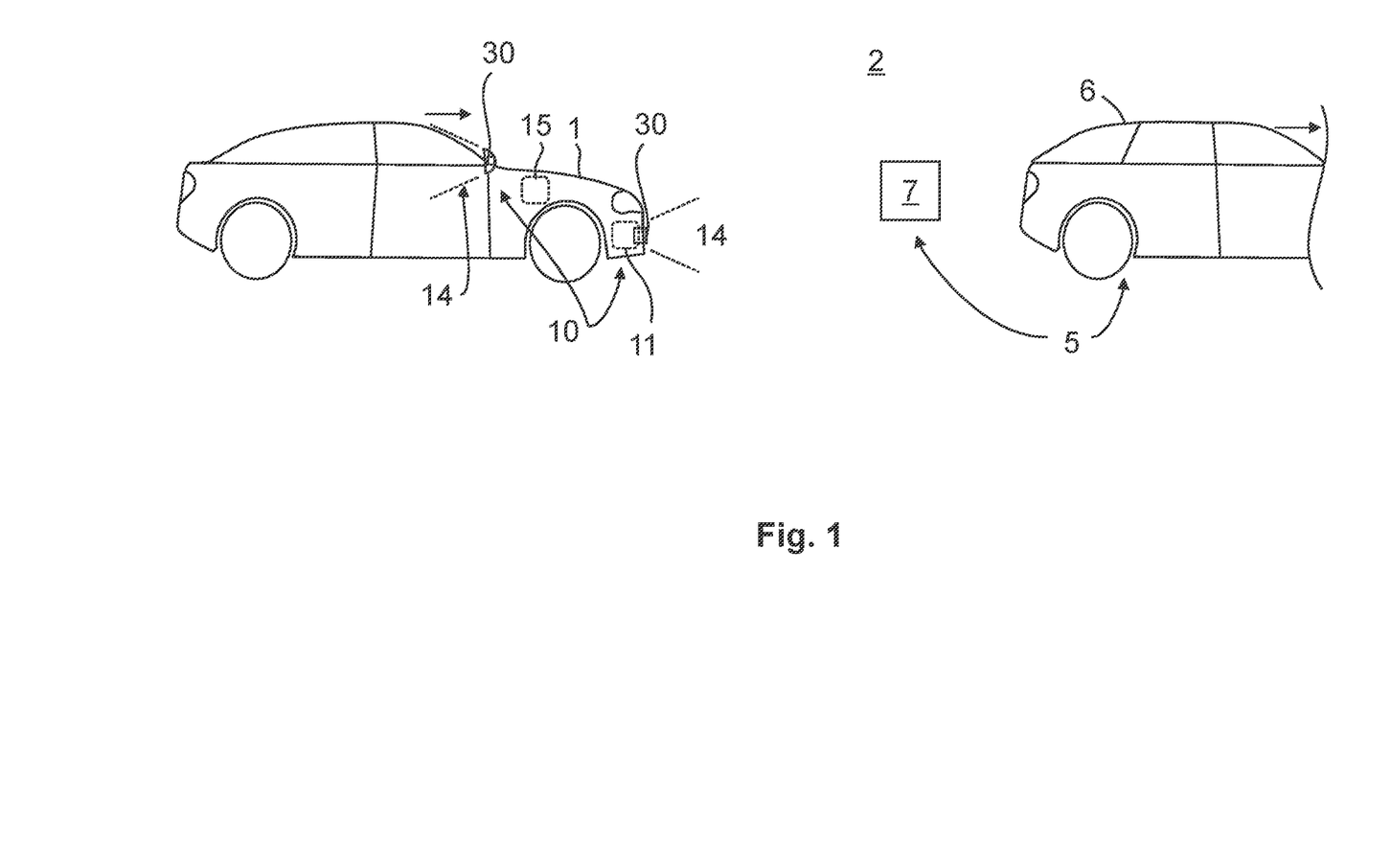
FIG. 1 is a schematic view of a vehicle with a radar system according to the invention and of another vehicle traveling in front, each in a side view.

FIG. 1 schematically shows a vehicle 1 with a radar system 10 according to the invention. An arrow symbolizes the direction of movement of the vehicle 1. In addition, a moving object 6 in the form of another vehicle traveling ahead and a static object 7 in the surroundings 2 of the vehicle 1 are shown. The moving object and the static object are each objects 5 which are located in at least one detection field 14 of the radar system 10. By way of example, different detection fields 14 for different positions of at least one reception antenna 30 are shown in FIG. 1, which can be provided alternatively or in combination. Thus, the radar system 10 can be arranged at least partially in the exterior mirror or in the bumper or the like. A radar sensor 11, as a detector 11 depending on the position of the vehicle 1, can thereby receive reflections from these objects 5 via the at least one reception antenna 30 and detect the objects 5 and/or reconstruct the surroundings 2 on the basis of these reflections. For this purpose, a detection signal 101 is acquired and signal processing of the detection signal 101 is performed by a processing device 15, wherein the detection signal 101 can be received by the at least one reception antenna 30.

Figure 2:
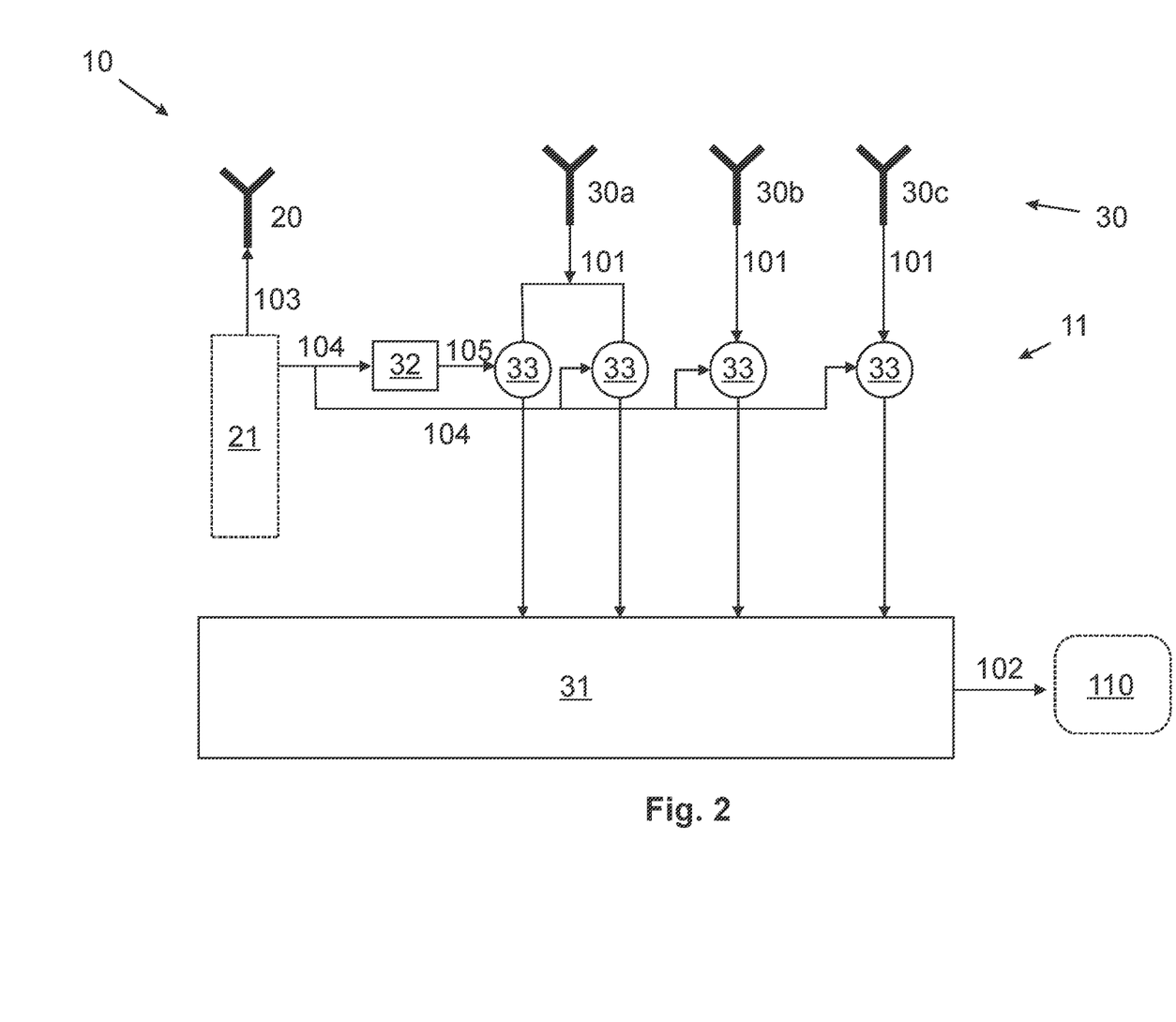
FIG. 2 is a schematic circuit diagram of components of a radar system according to the invention.
Figure 3:
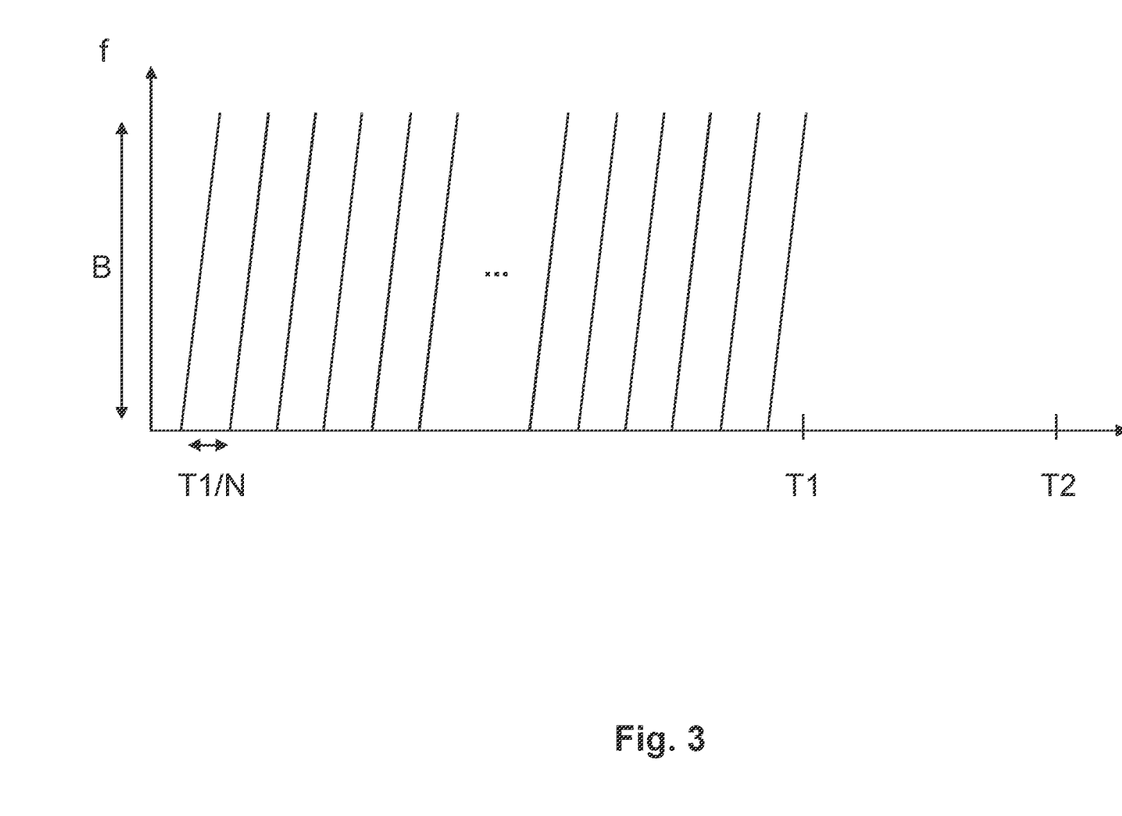
FIG. 3 is a schematic representation of a detection of a radar system according to the invention.

FIG. 2 illustrates the described detection with further details in more detail on the basis of a schematic circuit diagram of a radar system 10 according to the invention. By way of example, at least one transmission antenna 20 and at least one first 30a, second 30b and third 30c reception antenna are provided. First, a transmission signal 103 is generated via a transmission processing unit 21, which is radiated into the surroundings 2 of the vehicle 1 via the at least one transmission antenna 20. Such a transmission signal 103 is shown in more detail by way of example in FIG. 3. The radar system is, for example, a continuous wave radar and/or an FMCW radar (frequency-modulated continuous-wave radar), which in particular provides a distance and/or speed measurement, preferably by means of the Doppler effect. This may be, for example, a 24 GHz or 77 GHz radar system. In order to detect parameters of objects 5 in the surroundings 2 of the vehicle 1, such as distance or speed or the angle, the transmission signal 103 can be modulated with respect to the frequency f, for example. Advantageously, for detection, N frequency chirps within the time period T1 with a varying frequency f can be output sequentially as a transmission signal 103 via the at least one transmission antenna 20. In such a chirp, the frequency f can vary in time in the range of the bandwidth B. The time period of a respective chirp is then T1/N, as is also shown schematically by a double arrow in FIG. 3. For example, a linear frequency modulation can be used in which the frequency f changes linearly within the bandwidth B during a respective chirp. After the time period T1, an evaluation of a reception signal 101 (or also: detection signal 101) can take place within the period T2−T1. The entire measurement cycle thus has a time period T2.

According to FIG. 2, for receiving at least one detection signal 101, the reception antennas 30 can be arranged equidistantly at a predetermined distance. The emitted transmission signal 103 can be reflected and/or backscattered by each object 5 in the detection field 14 and thus reach at least one of the reception antennas 30. The detection signal 101 received thereby can then be demodulated and/or downconverted, in particular by the demodulator 33 or down-converters 33 shown. Subsequently, the detection signal 101 can be converted into digital detection information 102 by an analog-to-digital converter of a reception processing unit 31. By the end of the time period T1, the data thus acquired can be stored in an M×N matrix with M samples per chirp and N chirps. Using this matrix, a spectrum 110 specific to a relative velocity and/or a distance of the objects 5 (also: targets 5) in the surroundings 2 in the detection field 14 can then be determined by a Fourier transform of the matrix (i.e., the detection information 102). In particular, this is a two-dimensional spectrum 110 (corresponding to the two-dimensional matrix according to the detection information 102), so that the different coordinates represent the different parameters (such as the distance and the relative velocity).

In order to also be able to determine a phase of the detection signal 101 during detection, it may be possible for at least one of the down-conversions to be duplicated by the down-converters 33. In one of the down-conversions, the reference frequency 104 used for this purpose can then be phase shifted by a phase shifter 32 and thus converted into a phase shifted reference frequency 105. In this way, for example, an I & Q (in-phase & quadrature) procedure can be provided.

Figure 4:
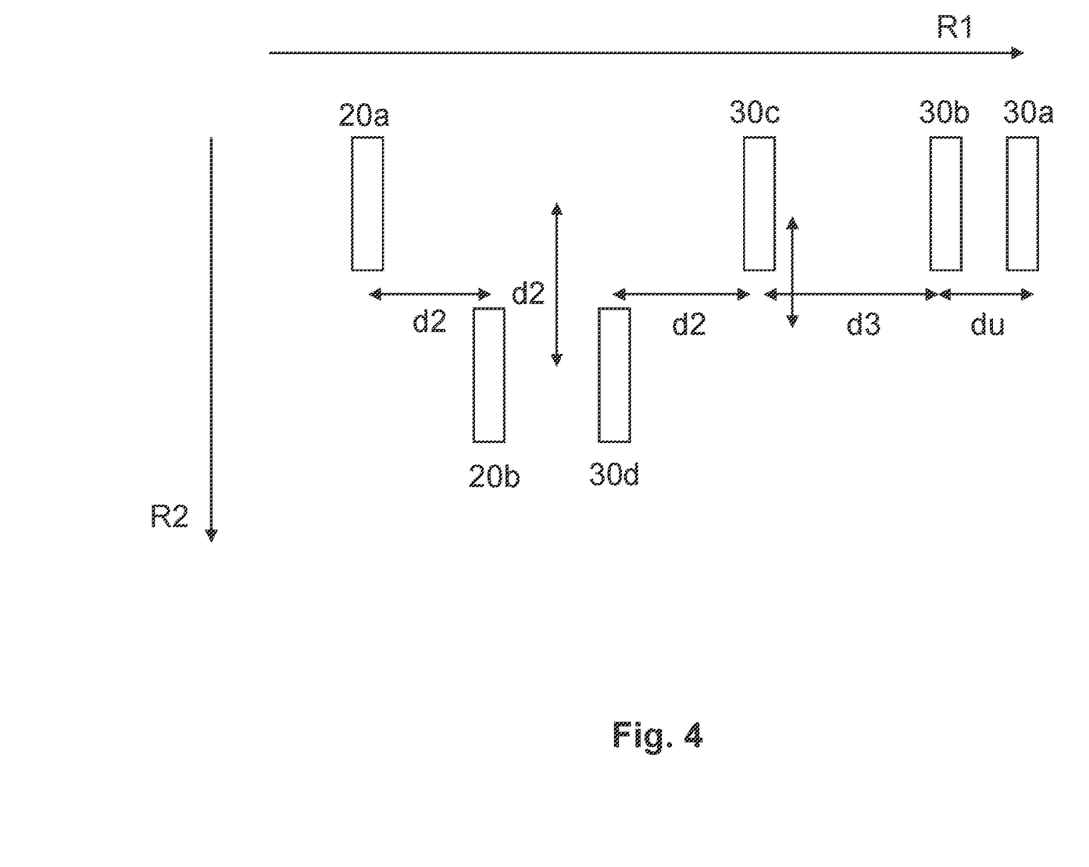
FIG. 4 is a schematic representation of an antenna arrangement of a radar system according to the invention.

FIG. 4 shows a schematic representation of an antenna arrangement of a radar system according to the invention. The radar system 10 can have the following components: at least two transmission antennas 20, each for emitting a transmission signal 103 into the surroundings 2 of the vehicle 1, at least four reception antennas 30, each for acquiring a detection signal 101 for detecting targets 5 in the surroundings 2 of the vehicle 1, and/or a processing device 15 for determining the viewing angle, in order to assign phase information in the detection signals 101 to at least one viewing angle for respective detected targets 5, such that a minimum ambiguous range du of the reception antennas 30 in a first direction R1 is specific for the assignment to be ambiguous to more than one viewing angle, wherein all of the reception antennas 30 are spaced apart from each other in the first direction R1 by different distances (du, d2, d3) such that only one of the distances corresponds to the minimum ambiguous range du.

Furthermore, a second direction R2 is also shown, in which, for example, the first 20a and second 20b transmission antennas may be arranged offset from each other by a distance d2. A first reception antenna 30a may further be arranged offset from a second reception antenna 30b by a minimum ambiguous range du. The second reception antenna 30b may in turn be arranged at a distance d3, in particular a threefold minimum ambiguous range du, from the third reception antenna 30c. The third reception antenna 30c can be arranged offset from a fourth reception antenna 30d in both the first direction R1 and the second direction R2 by a distance d2, in particular a twofold minimum ambiguous range du.

The preceding explanation of the embodiments describes the present invention exclusively in the context of examples. It goes without saying that individual features of the embodiments can be freely combined with each other, provided that this is technically reasonable, without leaving the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A radar system for a vehicle, the radar system comprising:
   at least two transmission antennas, each for emitting a transmission signal into the surroundings of the vehicle;
   at least four reception antennas, each for acquiring a detection signal for detecting targets in the surroundings of the vehicle; and
   a processing device to determine a viewing angle, in order to assign phase information in the detection signals to at least one viewing angle for respective detected targets, such that a minimum ambiguous range of the reception antennas in a first direction is set so that the assigned phase information is ambiguous to more than one viewing angle,
   wherein all of the reception antennas in the first direction are arranged at different distances from one another so that just one of the distances corresponds to the minimum ambiguous range.

2. The radar system according to claim 1, wherein the transmission antennas are arranged in a second direction at a second distance from one another, and at least one of the reception antennas in the second direction is arranged at the same second distance from the rest of the reception antennas, wherein the first direction and the second direction are orthogonal to each other.

3. The radar system according to claim 1, wherein the first direction is implemented as azimuthal direction so that all of the distances of the reception antennas in the azimuthal direction differ from each other.

4. The radar system according to claim 1, wherein one of the different distances of the reception antennas in the first direction corresponds to the minimum ambiguous range and the rest of the different distances of the reception antennas in the first direction each correspond to a multiple of the minimum ambiguous range.

5. The radar system according to claim 1, wherein the transmission antennas in the first direction or in the second direction are arranged at a distance from one another which corresponds to a multiple of the minimum ambiguous range.

6. The radar system according to claim 1, wherein exactly two transmission antennas and exactly four reception antennas are provided.

7. The radar system according to claim 1, wherein the arrangement of the transmission and reception antennas is implemented in accordance with a MIMO configuration.

8. The radar system according to claim 1, wherein the processing device is designed to use a different antenna combination of the transmission and reception antennas for the detection of the targets in the far field than that for the detection of the targets in the near field.

9. The radar system according to claim 1, wherein a first and second and a third of the reception antennas and a first of the transmission antennas are arranged in a second direction at a same position, and wherein a fourth of the reception antennas and/or a second of the transmission antennas is arranged offset to this position, and wherein the fourth of the reception antennas and second of the transmission antennas are arranged at the same position in the second direction.

10. The radar system according to claim 1, wherein the processing device is designed to perform a beamforming technique for determining the viewing angle.

11. The radar system according to claim 1, wherein the transmission antennas in the first direction and in the second direction are arranged at a distance from one another which corresponds to a multiple of the minimum ambiguous range.

12. The radar system according to claim 1, wherein the transmission antennas in the first direction are arranged at a distance from one another which corresponds to a multiple of the minimum ambiguous range.

13. The radar system according to claim 1, wherein the minimum ambiguous range is dependent on a wavelength specific to the radar system.

14. The radar system according to claim 1, wherein all of the at least two transmission antennas and all of the at least four reception antennas are used when detecting targets in a far field and less than all of the at least two transmission antennas and less than all of the at least four reception antennas are used when detecting targets in a near field.

15. The radar system according to claim 1, wherein the at least two transmission antennas are offset in a second direction orthogonal to the first direction.

16. The radar system according to claim 1, wherein at least one of the at least four reception antennas is offset from all of other of the at least four reception antennas in a second direction orthogonal to the first direction.

17. The radar system according to claim 1, wherein the at least two transmission antennas are offset in a second direction orthogonal to the first direction, and wherein at least one of the at least four reception antennas is offset from all of other of the at least four reception antennas in a second direction perpendicular to the first direction.

18. The radar system according to claim 1, wherein the at least two transmission antennas include exactly two transmission antennas and the at least four reception antennas include exactly four transmission antennas.

19. A radar system, comprising:
two transmission antennas each configured to emit a transmission signal into surroundings of a vehicle;
four reception antennas each for acquiring a detection signal for detecting targets in the surroundings of the vehicle; and
a processing device configured to determine a viewing angle for respective detected targets and to assign phase information in the detection signals to the viewing angle,
wherein all of the reception antennas are arranged at different distances from one another so that just one of the distances corresponds to a minimum ambiguous range of the reception antennas.

* * * * *